United States Patent
Barkarö et al.

(10) Patent No.: US 6,687,370 B1
(45) Date of Patent: Feb. 3, 2004

(54) METHOD AND AN ARRANGEMENT FOR SECURING AN ADSL CONNECTION

(75) Inventors: Stefan Barkarö, Solna (SE); Torbjörn Randahl, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 624 days.

(21) Appl. No.: 09/717,119

(22) Filed: Nov. 22, 2000

(30) Foreign Application Priority Data

Nov. 23, 1999 (SE) .............................................. 9904239

(51) Int. Cl.⁷ .............................. H04M 1/00; H04M 9/00
(52) U.S. Cl. .............................. 379/399.01; 379/93.08; 379/93.33; 379/382
(58) Field of Search .......................... 379/93.01, 93.05, 379/93.06, 93.08, 93.33, 399.01, 418, 382, 386

(56) References Cited

U.S. PATENT DOCUMENTS

| | | | |
|---|---|---|---|
| 6,269,154 B1 * | 7/2001 | Chellali et al. | 379/93.28 |
| 6,330,235 B1 * | 12/2001 | Olson et al. | 370/353 |
| 6,404,774 B1 * | 6/2002 | Jenness | 370/465 |
| 6,535,589 B1 * | 3/2003 | Nauman et al. | 379/93.33 |
| 6,542,465 B1 * | 4/2003 | Wang | 370/232 |
| 6,549,520 B1 * | 4/2003 | Gross et al. | 370/242 |
| 6,563,864 B1 * | 5/2003 | Ibrahim et al. | 375/222 |
| 6,567,646 B1 * | 5/2003 | Eklöf et al. | 375/222 |
| 6,590,893 B1 * | 7/2003 | Hwang et al. | 370/354 |
| 6,590,973 B1 * | 7/2003 | Bejman et al. | 379/377 |

FOREIGN PATENT DOCUMENTS

| | | |
|---|---|---|
| EP | 0653873 | 5/1995 |
| WO | WO97/20396 | 6/1997 |
| WO | WO99/34588 | 7/1999 |
| WO | WO99/59322 | 11/1999 |
| WO | WO00/30332 | 5/2000 |

* cited by examiner

Primary Examiner—Binh Tieu

(57) ABSTRACT

To secure an ADSL connection between a first ADSL transceiver (4) in a central office and a second ADSL transceiver (5) on a subscriber's premises on a telephone line (1) between a SLIC (2) in the central office and a telephone (3), a request to the SLIC (2) to apply a ringing signal to the telephone line (1) is detected. In response to such detection, the first ADSL transceiver (4) switches from a normal bit rate to a lower bit rate for the ADSL connection, and orders the second ADSL transceiver (5) to do the same before the ringing signal is applied. In response to an off-hook condition, the lower bit rate is maintained for the ADSL connection. In response to an on-hook condition after the off-hook condition as well as in response to a disappearance of the ringing request without an off-hook condition, the first ADSL transceiver (4) switches back to the normal bit rate and orders the second ADSL transceiver (5) to do the same.

2 Claims, 1 Drawing Sheet

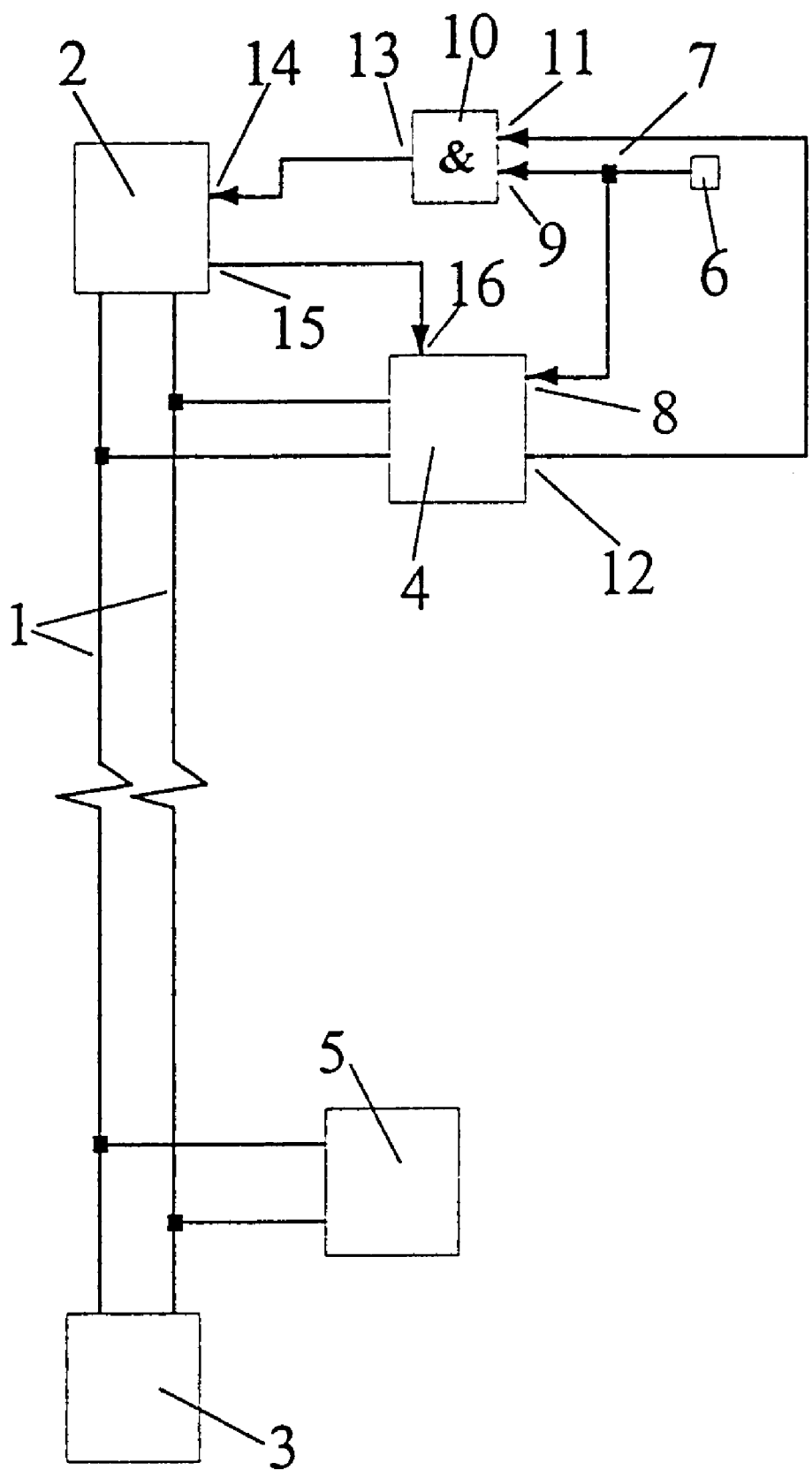

METHOD AND AN ARRANGEMENT FOR SECURING AN ADSL CONNECTION

TECHNICAL FIELD

The invention relates generally to Asymmetrical Digital Subscriber Line (ADSL) systems and more specifically to a method and an arrangement for securing an ADSL connection via a telephone line between an ADSL transceiver in a central office and an ADSL transceiver connected together with a telephone to the telephone line on a subscriber's premises.

BACKGROUND OF THE INVENTION

This invention is related to the invention described in Swedish patent application No. 9801646-2.

As described in the above patent application, in ADSL systems, data signals are transferred at the same time as telephony on a common telephone line.

The telephone traffic and the ADSL traffic have to be able to coexist on the telephone line, i.e. one should be able to talk in a telephone that is connected to the telephone line at the same time as a computer on the subscriber's premises is connected to the telephone line without disturbing either traffic.

In traditional ADSL technology, this is solved by means of a so called splitter, which in principle is a high-order filter which is connected in series with the telephone and makes the telephone "invisible" for ADSL signals. By means of such a filter, disturbances from the telephone to an ADSL modem are avoided, e.g. when the telephone goes off-hook, i.e. when the impedance in the telephone is abruptly changed from a high to a low value. Without such filter, this would result in a changed attenuation of the ADSL signals and, consequently, in a changed signal-to-noise ratio. In its turn, this could cause the ADSL system to loose synchronization, since the ADSL modem is set up for signal-to-noise ratios that existed when the modem was initialized.

The major problem with such a splitter filter is that it is very expensive and bulky. Moreover, it takes a specialist to install such a filter, which makes it even more expensive.

To facilitate the exploitation of ADSL, a form of ADSL has been defined, for which it will be possible to run telephone traffic and ADSL traffic simultaneously without such splitters but with reduced performance. This application is popularly called ADSL-Lite or splitterless ADSL.

However, the risk of loosing the synchronization still remains in those systems.

Upon a call to the telephone, the telephone station first sends out a ringing signal having a frequency between 20 and 60 Hz depending on the market, and having a signal level which is specified to be at least 40 V r.m.s. at the telephone. Often, the level is considerably higher.

When the telephone goes off-hook, the impedance is abruptly changed to a considerably lower level.

In the case of ADSL, it is of particular interest which impedance the telephone has in the ADSL band.

For ADSL-Lite, a downstream band, i.e. traffic from the station to the subscriber, of around 550 kHz is considered, while an upstream band, i.e. traffic from the subscriber to the station, of 138 kHz is considered.

Measurements of some typical telephones give the following impedance values:

On-hook impedance @ 100 kHz=3 k$\Omega$
On-hook impedance @ 400 kHz=800$\Omega$
Off-hook impedance @ 100 kHz=60$\Omega$
Off-hook impedance @ 400 kHz=8$\Omega$ The driving and terminating impedance of the ADSL modem is normally adapted to the characteristic impedance of the telephone line within the ADSL band, which is around 100$\Omega$. Considering the load that the modem on the subscriber side sees looking out onto the line, it will be very different in the above cases.

Suppose that the characteristic impedance of the line is equal to 100$\Omega$ and that the line is correctly terminated on the station side with 100$\Omega$ in the ADSL band.

The load seen looking out from the modem is of importance only for the upstream band, i.e. up to 138 kHz:
Load On-hook @ 100 kHz=97$\Omega$
Load Off-hook @ 100 kHz=37$\Omega$ In the same manner as the load changes, the terminating impedance for downstream traffic will change:
Terminating Impedance On-hook @ 400 kHz=89$\Omega$
Terminating Impedance Off-hook @ 400 kHz=7.5$\Omega$ In principle, this means that both the incoming and outgoing signals will be considerably more attenuated for the off-hook case than with the telephone in on-hook condition. This implies a great risk for the ADSL system to loose the synchronization, since bit allocation is carried out in correspondence to the conditions at hand during the training sequence which is normally run with the telephone in on-hook condition.

ADSL utilizes Discrete Multi-Tone (DMT) coding according to which the available bandwidth is divided into 4.3 kHz channels. During the training sequence, the signal-to-noise ratio in all channels is measured and, thereafter, it is decided how many data bits can be allocated to a certain carrier channel.

For ADSL-Lite, 256 QAM (Quadrature Amplitude Modulation) is used, which means that a maximum of 8 bits can be allocated to each carrier channel. When the telephone goes off-hook, the signal levels will be lowered due to further attenuation, which means that the signal-to-noise ratio will be degraded.

The upstream traffic will have a three times lower signal level or a signal-to-noise ratio degradation of 9.5 dB, while the degradation downstream can be as much as twelve times or 21.5 dB. Due to this considerable impedance change in the ADSL band in off-hook condition of the telephone in an ADSL-Lite application, the signal-to-noise ratio is degraded so much that the system will loose the synchronization and have to be restarted by means of a new training sequence.

BRIEF DESCRIPTION OF THE INVENTION

The object of the invention is to secure, at the central office end, an ADSL connection between an ADSL transceiver in a central office and an ADSL transceiver at a telephone via a telephone line that is used in common with the telephone, in connection with a call to the telephone.

This is attained in accordance with the invention by detecting a ringing request directed to the telephone and, in response thereto, lowering the bit rate allocated to the ADSL connection until the ringing request either has disappeared without the telephone having gone off-hook or until the telephone goes on-hook again after having been off-hook.

Hereby, the risk of loosing the synchronization will be more or less eliminated.

BRIEF DESCRIPTION OF THE DRAWING

The invention will be described more in detail below with reference to the appended drawing on which the single FIGURE shows one embodiment of an arrangement according to the invention for securing an ADSL connection from a central office.

DESCRIPTION OF THE INVENTION

The single FIGURE illustrates an embodiment of an arrangement according to the invention for securing an ADSL connection on a telephone line 1 between a subscriber line interface circuit (SLIC) 2 in a central office (not shown) and a telephone 3 on a subscriber's premises (not shown).

To establish the ADSL connection on the telephone line 1, an ADSL transceiver 4 is connected to the telephone line 1 at the central office, and an ADSL transceiver 5 is connected to the telephone line on the subscriber's premises.

Normally, the ADSL transceivers 4, 5 communicate via the telephone line 1 using a normal, high bit rate. From the central office to the subscriber's premises, i.e. downstream, the bit rate is approximately 3 Mb/s, and from the subscriber's premises to the central office, i.e. upstream, the bit rate is approximately 0.6 Mb/s.

As indicated above in the introductory portion, there is a risk of loosing the synchronization of the ADSL connection when the telephone 3 goes off-hook due to the fact that the impedance of the telephone line 1 is abruptly changed to a considerably lower value when the telephone 3 goes off-hook.

In accordance with the invention, the problem of loosing such synchronization is eliminated, at the central office, for a call to a telephone by means of the arrangement according to the invention.

Upon a call to the telephone 3, the SLIC 2 is caused to connect a ringing signal to the telephone line 1.

In accordance with the invention, a ringing request detector 6 in the central office detects a request directed to the SLIC 2 to apply a ringing signal to the telephone line 1.

The ringing request detector 6 is connected with its output 7 to a control input 8 of the ADSL transceiver 4 as well as to one input 9 of an AND circuit 10. The other input 11 of the AND circuit 10 is connected to an output 12 of the ADSL transceiver 4, and the output 13 of the AND circuit 10 is connected to an input 14 the SLIC 2 to control a ringing relay control loop (not shown).

The SLIC 2 has an off-hook detector output 15 connected to an input 16 of the ADSL transceiver 4.

A request to the SLIC 2 to apply a ringing signal to the telephone line 1 is detected by the ringing request detector 6, as mentioned above. In response to such a detection of a ringing request, the output terminal 7 of the ringing request detector 6 goes high. That high signal level on the control input 8 of the ADSL transceiver 4 causes the ADSL transceiver 4 (actually a processor in the ADSL transceiver) to lower its bit rate for the ADSL connection to a bit rate that is lower than the normal bit rate for the ADSL connection.

The ADSL transceiver 4 orders the ADSL transceiver 5 via the telephone line 1 to lower its bit rate from the normal bit rate to the lower bit rate.

The ADSL transceiver 5 confirms to the ADSL transceiver 4 that it has switched to the lower bit rate.

Upon receiving such a confirmation via the telephone line 1, the ADSL transceiver 4 outputs a high level confirmation signal on its output 12 to the input 11 of the AND circuit 10. Thus, both input 9 and input 11 of the AND circuit 10 are now high, which means that the output 13 of the AND circuit 10 also will be high. That high signal level on the output 13 of the AND circuit 10 will trigger the SLIC 2 via the input 14 to control the ringing relay control loop. (not shown) such that a ringing signal is applied to the telephone line 1 to the telephone 3.

Thus, there is a ringing signal on the telephone line 1 at the same time as the bit rate of the ADSL connection on the telephone line 1 is low.

As long as the telephone 3 is in an on-hook condition, the loop detector output terminal 15 of the SLIC 2 is low.

Now, the call can be answered or not at the telephone 3.

Call Answered

When the call is answered, i.e. the telephone 3 goes off-hook, the loop detector output 15 of the SLIC 2 goes high.

At the same time, the output 7 of the ringing request detector 6 will go low as controlled by a control processor (not shown), but as long as the loop detector output 15 is high, the lower bit rate will be maintained by the ADSL transceiver 4 despite the fact that the output 7 of the ringing request detector 6 and, consequently, the control input 8 of the ADSL transceiver 4 is low.

When the call is terminated, i.e. when the telephone 3 goes on-hook again, the loop detector output 15 from the SLIC 2 will go low. Since also the control input 8 to the ADSL transceiver 4 is low, the ADSL transceiver 4 will switch back to the normal, high bit rate again and inform the ADSL transceiver 5 thereof.

Call Not Answered

If the call is not answered at the telephone 3, i.e. the ringing sequence is interrupted without the telephone 3 going off-hook, the ringing request disappears and the output 7 of the ringing request detector 6 goes low.

Hereby, the input 9 to the AND circuit 10 will go low as well as its output 13, interrupting the application of the ringing signal by means of the SLIC 2 to the telephone line 1.

At the same time, the control input 8 to the ADSL transceiver 4 goes low, causing the ADSL transceiver 4 to switch back to the normal, high bit rate again. Also in this case, the ADSL transceiver 4 orders the ADSL transceiver 5 to also switch back to the normal, higher bit rate.

As should be apparent from the above, the arrangement in accordance with the invention secures an ADSL connection on a telephone line from the central office end upon a call to a telephone connected to the telephone line by lowering the bit rate of the ADSL connection.

What is claimed is:

1. A method of securing an ADSL connection on a telephone line (1) between a subscriber line interface circuit (2) in a central office and a telephone (3) on a subscriber's premises, a first ADSL transceiver (4) being connected to the telephone line (1) at the central office, and a second ADSL transceiver (5) being connected to the telephone line (1) on the subscriber's premises, the first and the second ADSL transceivers (4, 5) normally communicating using a first, normal bit rate, characterized by detecting, at the central office, a request to the subscriber line interface circuit (2) to apply a ringing signal to the telephone line (1), in response to such a detection, controlling the first ADSL transceiver (4) to switch from the first, normal bit rate to a second, lower bit rate for the ADSL connection, ordering the second ADSL transceiver (5) to switch from the first, normal bit rate to the second, lower bit rate, confirming to the first ADSL transceiver (4) that the second ADSL transceiver (5) has switched to the second, lower bit rate, upon such confirmation, causing the subscriber line interface circuit (2) to apply the ringing signal to the telephone line (1), in response to an off-hook condition at the telephone (3), maintaining the second, lower bit rate for the ADSL connection, and in response to an on-hook condition after the off-hook condition at the telephone (3) as well as in response to a disappearance of the request to apply a ringing signal without the telephone (3) having gone off-hook, controlling the first ADSL transceiver (4) to switch back to the first, normal bit rate, and ordering the second ADSL transceiver (5) to switch back to the first, normal bit rate.

2. An arrangement for securing an ADSL connection on a telephone line (1) between a subscriber line interface circuit (2) in a central office and a telephone (3) on a subscriber's premises, a first ADSL transceiver (4) being connected to the telephone line (1) at the central office, and a second ADSL transceiver (5) being connected to the telephone line (1) on the subscriber's premises, the first and the second ADSL transceivers (4, 5) normally communicating using a first, normal bit rate, characterized in that it comprises at the central office, a ringing request detector (6) for detecting a request to the subscriber line interface circuit (2) to apply a ringing signal to the telephone line (1), the ringing request detector (6) being adapted, in response to such a detection, to control the first ADSL transceiver (4) to switch from the first, normal bit rate to a second, lower bit rate for the ADSL connection, and to order the second ADSL transceiver (5) to switch from the first, normal to the second, lower bit rate, that the second ADSL transceiver (5) is adapted to confirm to the first ADSL transceiver (4) that it has switched to the second, lower bit rate, that the first ADSL transceiver (4) is adapted, in response to such confirmation, to control the subscriber line interface circuit (2) to apply the ringing signal to the telephone line (1), in response to an off-hook condition at the telephone (3) as detected in the central office, to maintain the second, lower bit rate for the ADSL connection, and in response to an on-hook condition after the off-hook condition as detected by in the central office as well as in response to a disappearance of the request to apply a ringing signal without the telephone (3) having gone off-hook, to control the first ADSL transceiver (4) to switch back to the first, normal bit rate, and order the second ADSL transceiver (5) to switch back to the first, normal bit rate.

\* \* \* \* \*